United States Patent

[11] 3,569,995

[72] Inventors Barbara J. Mallon
  Livermore;
  Lyman E. Lorensen, Orinda, Calif.
[21] Appl. No. 755,194
[22] Filed Aug. 26, 1968
[45] Patented Mar. 9, 1971
[73] Assignee The United States of America as represented by the United States Atomic Energy Commission

[54] LOW ENERGY RADIATION DOSIMETRY METHOD IN THE RANGE OF 15 KEV AND BELOW
4 Claims, 4 Drawing Figs.

[52] U.S. Cl. .................................................. 250/83
[51] Int. Cl. .................................................. G01t 1/04
[50] Field of Search .......................................... 250/83 (CD), 83

[56] References Cited
UNITED STATES PATENTS

| | | | |
|---|---|---|---|
| 2,875,047 | 2/1959 | Oster .......................... | 250/83CD |
| 2,882,415 | 4/1959 | Pressau ....................... | 250/83CD |
| 3,450,878 | 6/1969 | Pezdirtz et al. ............... | 250/83CD |

OTHER REFERENCES

Charlesby et al; " The Degradation of Solid Polymethyl-Methacrylate by Ionizing Radiation" ; Royal Society of London Proceedings; Series A, Vol. 223, 1959 pages 392— 3

Golden et al; Journal of Polymer Science part A; Vol 2, pp 4017—4029, 1964, 250— 83CD Primary Examiner—James W. Lawrence
Assistant Examiner—Morton J. Frome
Attorney—Roland A. Anderson ABSTRACT: A method for measuring low-energy, high-flux radiation doses. Thin layers of poly- [3,3-bis (chloromethyl) oxacyclobutane] are exposed to ionizing radiation. Changes in physical properties of the layers are a measure of the radiation dose received.

INVENTORS
BARBARA J. MALLON
LYMAN E. LORENSEN

BY
*Roland A. Anderson*

ATTORNEY

LOW ENERGY RADIATION DOSIMETRY METHOD IN THE RANGE OF 15 KEV AND BELOW

BACKGROUND OF THE INVENTION

This invention was made in the course of, or under, Contract W-7405-ENG-48 with the United States Atomic Energy Commission.

This invention pertains to dosimetry, and more particularly, to a method for measuring radiation dosages using a plastic material. etc.

Plastic dosimetry relies on the phenomenon of degrading and cross-linking in polymers. Ionizing radiation disrupts chemical bonds of polymers, causing breakups and new linkages of chains of molecules. New substances thus exhibit new physical properties, including changed molecular weight, opacity, elasticity, viscosity, tensile properties, etc. The extent to which these changes occur is a measure of the intensity of ionizing radiation.

In prior art plastic dosimeters, high-energy radiation alters the measurable physical properties of the dosimeters; that is, degrading and cross-linking are induced principally by high-energy radiation, i.e., above 100 k.e.v. For energies below 100 k.e.v., radiation-induced changes are more subtle and difficult to measure. Nevertheless, there has been a continuing interest in measuring radiation dosages below this range.

Most conventional X-ray detectors fail to at very low energy (less than 15 k.e.v.). In this energy range, the absorption coefficient for X-rays is changing rapidly for most detector materials. The result is that X-ray absorption is not uniformly proportional nor predictable. Accordingly, our object is to make a dosimeter which is sensitive to radiation below 15 k.e.v.

SUMMARY OF THE INVENTION

This object is accomplished with the unexpected discovery that one material, out of hundreds of organic substances, registers radiation below 15 k.e.v., independent of speed of exposure or dose rate. Our material is a chlorinated polyether thermoplastic polymer which is particularly sensitive to this low-energy radiation. A mass of the above material is exposed to an incident beam of radiation. The polymeric material permanently records a dose level indicative of the radiation flux falling upon it in the energy range below 15 k.e.v. It is read by comparing an exposed specimen with previously calibrated samples of the same material. The material which exhibits the unusual radiation sensitivity stability is poly-[3,3-bis(chloromethyl)oxacyclobutane. This material is available from Hercules, Inc. Wilmington, Del., under the trademark Penton. Its properties are discussed in an article by Golden and Hazell in the Journal of Polymer Science, Part A, Vol 2, pp. 4017—4030 (1964), entitled "Degradation of Poly-3, 3-bis (chloromethyl) oxacyclobutane (Penton)."

DESCRIPTION OF THE INVENTION

From the FIGS. it is apparent that large doses will induce marked physical changes. Doses of the magnitude shown on the graphs are useful in food preservation and in industrial diagnostic work. Doses larger than those indicated on the graphs may be scaled down by interposing a filtering material between the dosimeter and the X-ray source. A metal filter, such as an aluminum sheet, can attenuate the beam by X-ray absorption and scattering.

When a high-energy X-ray impinges on a poly-[3,3-bis(chloromethyl)oxacyclobutane mass, the observable physical properties indicate that energy has been absorbed. As mentioned previously, energy absorption is rapidly varying in incremental energy regions below 15 k.e.v. in a known manner. The beam spectrum is indicative of the fraction of total energy lying within said incremental regions. The amount of energy absorbed in an incremental energy region below 15 k.e.v. may be found by multiplying the beam intensity by the fraction of energy which is absorbed by this material from the energy distribution present. By summing over all increments the total energy absorbed may be found.

Radiation-induced changes in physical properties of poly-[3,3-bis (chloromethyl)oxacyclobutane] are then compared with previously calibrated specimens. A recommended procedure is to simultaneously heat a thin, unexposed reference specimen and a thin, exposed specimen. Melting point and heat of fusion are then translated into absorbed dose from the graphs of FIGS. 1 or 2. For the same total absorbed energy, the same change in physical properties occurs, yielding a measure of absorbed dose. Exposed specimens give more constant values if they are heated to 180° C, prior to measurement. This removes gases formed during irradiation. The specimens are then systematically cooled. A mass of poly-[3,3-bis(chloromethyl)oxacyclobutane] will have more pronounced changes in physical properties near the surface. The absorbed dose in a thick mass becomes smaller at regions further from the surface for two reasons: (1) the intensity of the beam becomes less, due to absorption; and (2) the spectrum becomes more energetic due to preferential absorption of the lower energy photons. These properties may be advantageously used to gain dosimetric data by slicing the mass. It is sliced perpendicular to a single direction from which an X-ray beam enters the mass. Each slice is an individual dosimeter. Slices closer to the surface sustain more radiation damage as indicated by their physical properties. Slices further from the surface sustain radiation damage principally from the high energy end of the spectrum. Accordingly, a comparison of slices from the same exposed mass shows a spectrum-dependent damage gradient indicating dose distribution.

Figure 1:
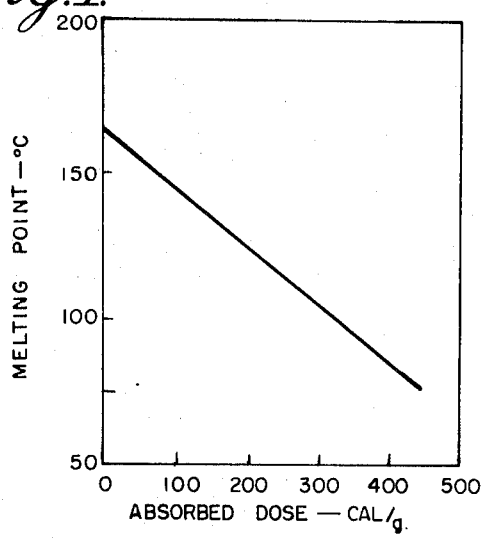
FIG. 1 is a graph of an example of absorbed dose vs. melting point for poly-[3,3-bis(chloromethyl)oxacyclobutane] exposed to an X-ray beam from a 50 k.v.p. constant potential electron beam directed onto a tungsten target through a thin beryllium window. The X-ray beam has an energy spectrum principally within the 4—15 k.e.v. energy range.
Figure 2:
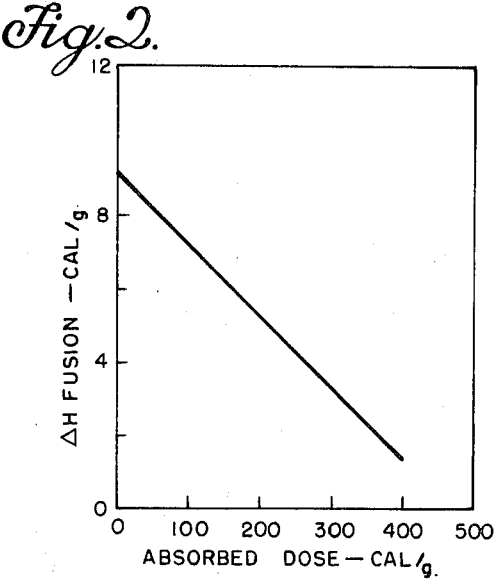
FIG. 2 is a graph of absorbed dose vs. heat of fusion for the same sample under the same beam.
Figure 3:
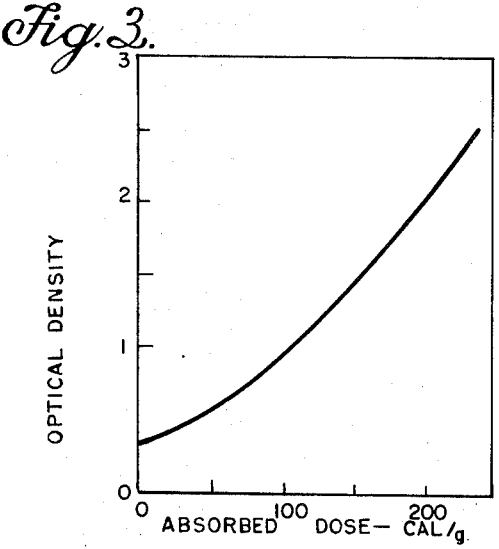
FIG. 3 is a graph of absorbed dose vs. optical density for the same sample under the same beam.
Figure 4:
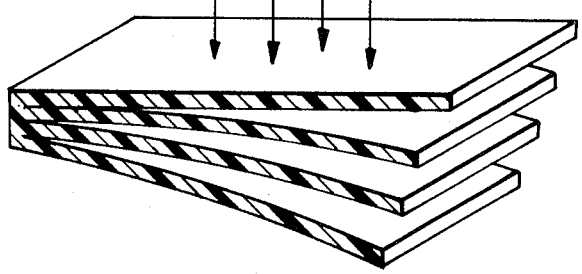
FIG. 4 is a perspective view of a dosimeter of the present invention.

A single specimen of poly-[3,3-bis(chloromethyl)oxacyclobutane] can determine the curves of FIGS. 1 to 3, correlating changes in physical properties with many absorbed doses. There is a known relationship between absorbed dose in a mass of the thermoplastic and the change in physical properties. Once the absorbed doses are calibrated with dose-related physical changes for a particular X-ray source, other specimens of poly-[3,3-bis(chloromethyl)oxacyclobutane] readily indicate the absorbed dose and, therefore, length of exposures under the same source.

The underlying phenomenon causing changes in physical properties is related to changed molecular structure as a response to radiation, particularly in the energy range of 4-—15 k.e.v. For example, the molecular weight and viscosity are different. Other changes are also apparent. The important consideration is that, for radiation energies in the aforementioned 4—15 k.e.v. range, poly-[3,3-bis(chloromethyl)oxacyclobutane] registers a predictable absorbed dose that heretofore has not been accurately measurable.

We claim:

1. A method for determining an absorbed X-ray dose in the 4 to 15 k.e.v. X-ray range, comprising the steps of:
   a. irradiating a calibration mass of poly-[3,3-bis(chloromethyl)oxacyclobutane with a known dosage of X-rays of said energy, and determining the magnitude of changes in physical properties induced therein by said known dosage as a basis against which the magnitude for changes in said mass may be calibrated;

b. exposing a dosimeter mass of poly-[3,3-bis (chloromethyl) oxacyclobutane] to X-rays in said energy range, from a single direction;
c. slicing said dosimeter mass at least once in a plane perpendicular to said single direction; and
d. determining the magnitude of substantial changes in physical properties in each of said slices by comparison with the changes in said calibration mass, they establishing variations in absorbed dose with depth as a measure of X-ray energies within said 4 to 15 k.e.v. energy range.

2. The method of claim 1 further defined wherein said changes in the physical properties of said poly-[3,3-bis (chloromethyl) oxacyclobutane] are changes in melting point.

3. The method of claim 1, further defined wherein said changes in the physical properties of said poly-[3,3-bis (chloromethyl) oxacyclobutane] are changes in the heat of fusion.

4. The method of claim 1, further defined wherein said changes in the physical properties of said poly-[3,3-bis (chloromethyl) oxacyclobutane] are changes in optical density.

UNITED STATES PATENT OFFICE
CERTIFICATE OF CORRECTION

Patent No. 3,569,995           Dated March 9, 1971

Inventor(s) Barbara J. Mallon, Lyman E. Lorensen

It is certified that error appears in the above-identified patent and that said Letters Patent are hereby corrected as shown below:

In The Specification:

Column 1, line 27, cancel "to".

Column 2, line 74, cancel "for" and insert -- of --.

Column 3, line 8, cancel "they" and insert -- thereby --.

Signed and sealed this 10th day of August 1971.

(SEAL)
Attest:

EDWARD M. FLETCHER, JR.          WILLIAM E. SCHUYLER, JR.
Attesting Officer                  Commissioner of Patents